March 6, 1962  H. N. STEPHAN  3,023,675

HORIZONTAL BORING, DRILLING AND MILLING MACHINE

Filed Nov. 13, 1958  3 Sheets-Sheet 1

INVENTOR
HALLIS N. STEPHAN
BY Hudson, Boughton,
Williams, David & Hoffmann
ATTORNEYS March 6, 1962  H. N. STEPHAN  3,023,675
HORIZONTAL BORING, DRILLING AND MILLING MACHINE
Filed Nov. 13, 1958  3 Sheets-Sheet 2
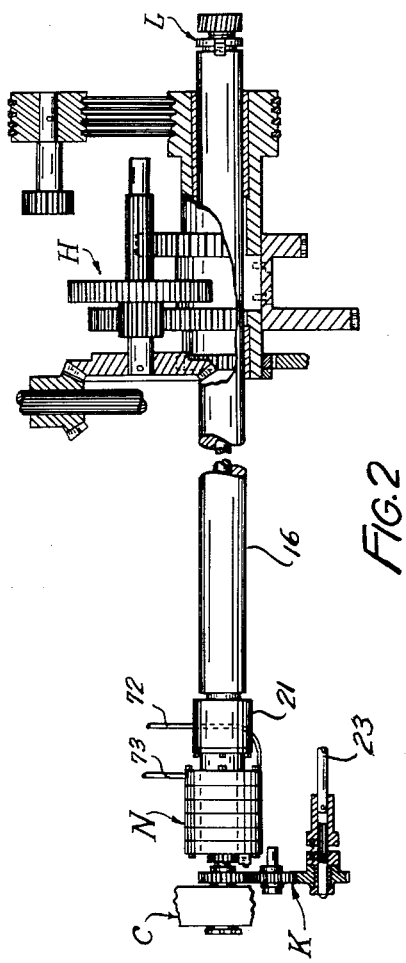
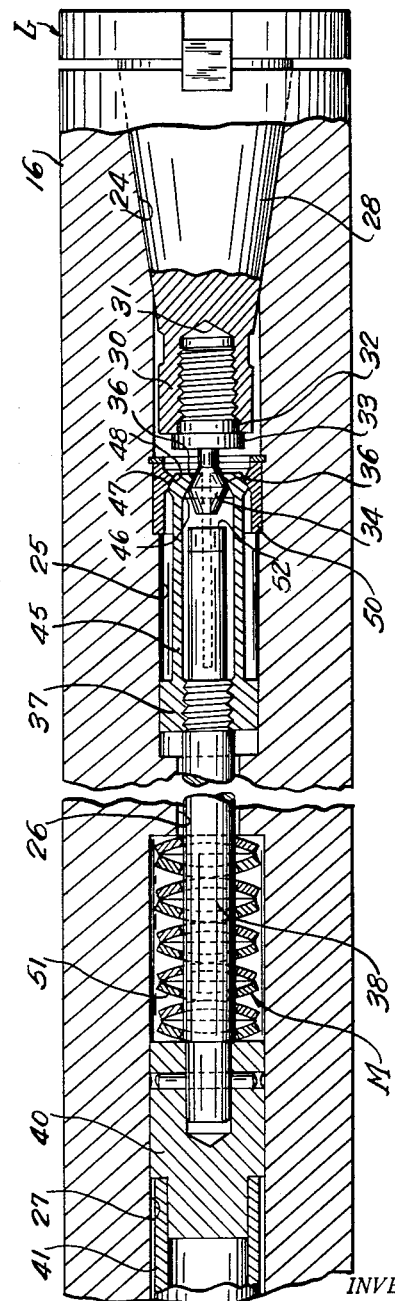
INVENTOR.
HALLIS N. STEPHAN
BY Hudson, Boughton,
Williams, David & Hoffmann
ATTORNEYS

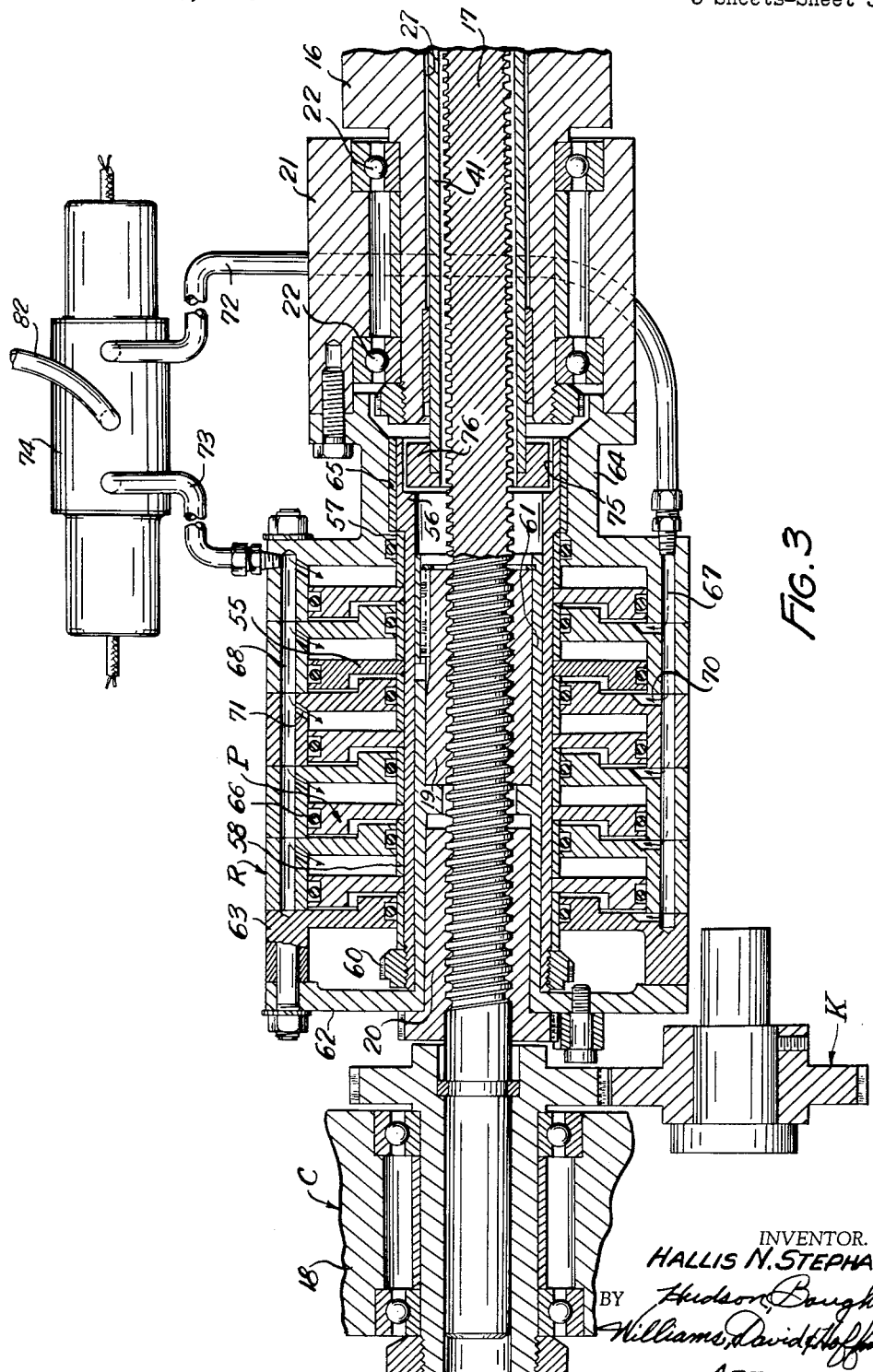

United States Patent Office 3,023,675
Patented Mar. 6, 1962

3,023,675
HORIZONTAL BORING, DRILLING AND
MILLING MACHINE
Hallis N. Stephan, Shaker Heights, Ohio, assignor to The
New Britain Machine Company, New Britain, Conn.,
a corporation of Connecticut
Filed Nov. 13, 1958, Ser. No. 773,750
2 Claims. (Cl. 90—11)

The present invention relates to machine tools, especially, combined horizontal boring, drilling and milling machines, and, more particularly, to the tool spindle mechanism thereof.

The principal object of the present invention is the provision of a new and improved machine tool, particularly a combined horizontal boring, drilling and milling machine, having a tool spindle provided with an aperture terminating in a tool arbor receiving socket opening into its forward end for releasably securing the tool arbor in the spindle socket which binding means comprises a movable binding member positionable between a fixed, inclined abutment surface carried by the spindle and a surface on the arbor to wedge the tool arbor in the spindle socket, in combination with means for biasing the binding means to its locking or binding position and power actuated means for releasing the tool arbor from its seat in the spindle socket, the power means being so constructed and arranged that it is of small diameter relative to that of the spindle.

The invention resides in certain constructions and combinations and arrangements of parts, and further objects and advantages of the invention will be apparent to those skilled in the art to which it relates from the following description of the preferred embodiment described with reference to the accompanying drawings forming a part of this specification, and in which:

FIG. 2 is a fragmentary view of the machine shown in FIG. 1, partly in section and partly schematic, showing the tool spindle and certain parts of the driving mechanism therefor;

FIG. 3 is a sectional view of the left hand end of the tool spindle shown in FIG. 2; and FIG. 4 is a sectional view similar to FIG. 3 but showing the right hand end of the spindle.

Figure 1:
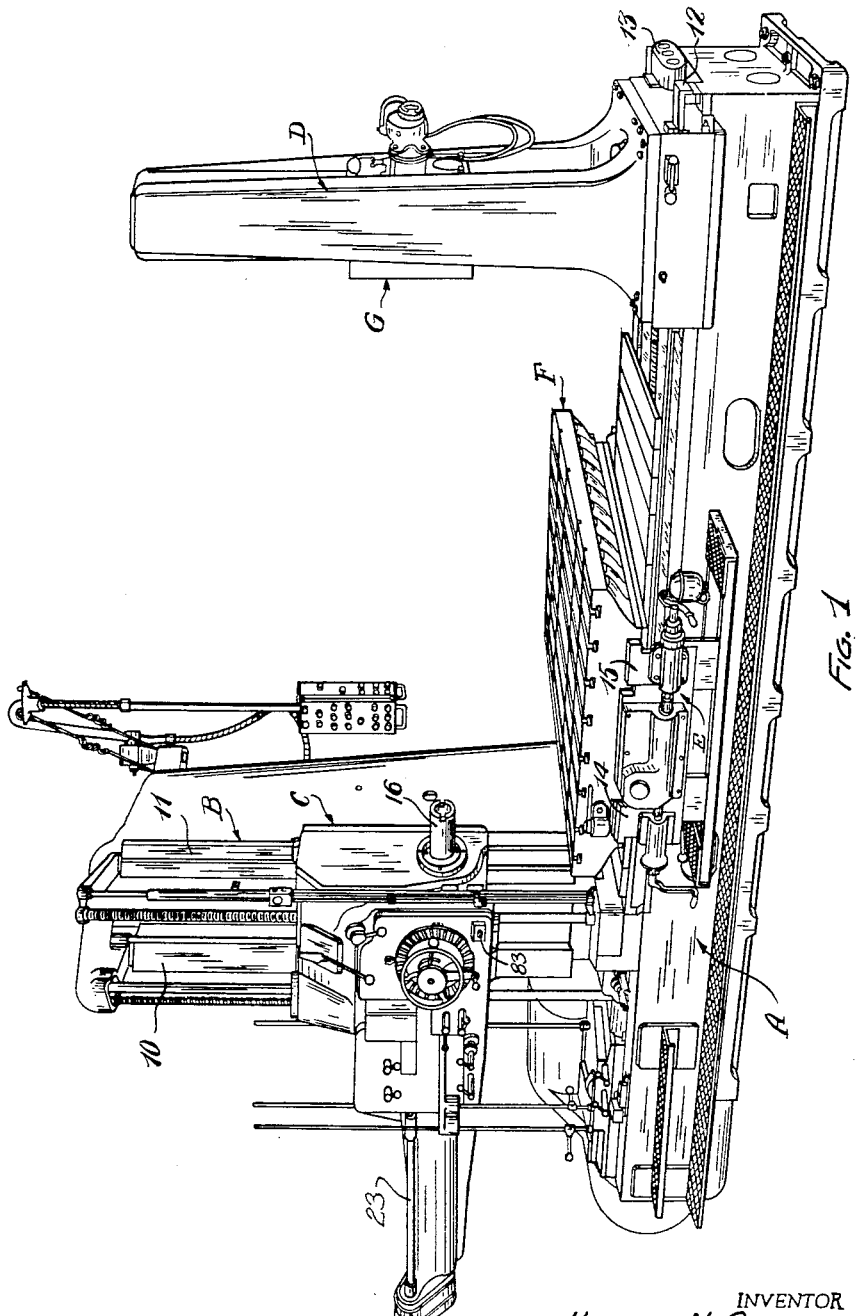
FIG. 1 is a perspective view of a combined horizontal boring, drilling and milling machine embodying the present invention.

Referring to the drawings, the combined horizontal boring, drilling and milling machine, shown therein, is generally similar to that disclosed in the U.S. Patent to Lucas et al. 2,350,174 and comprises a base A, provided at one end with a spindlehead column B formed with vertical ways 10 and 11 upon which a spindlehead C is mounted for vertical movement, and at the other end with a backrest or an outboard support column D slidably supported on horizontal ways 12 and 13 on the upper side of the bed. The ways 12 and 13 also support a saddle E having transversely extending horizontal ways 14 and 15 on the upper side thereof which, in turn, supports a worktable F. The backrest column D has vertical ways upon which a backrest block G is mounted for vertical movement. The spindlehead C, outboard support column D, saddle E, table F and backrest block G may be moved in any conventional manner, the details of which are not necessary for the understanding of the present invention and are not shown.

The spindlehead C supports a tool spindle 16, which spindle is adapted to be rotated by suitable driving mechanism indicated generally as H and which is more fully explained in the aforesaid patent. The spindle 16 is also adapted to be fed or rapid traversed axially in either direction by a lead screw 17, the left hand end of which is rotatably supported against axial movement in a part 18 of the spindlehead. The right-hand end of the lead screw 17 projects into the left-hand end of the spindle 16 and has threaded engagement with a two-piece anti-blacklash nut 19, 20 carried by the feed slide 21 which slide is in turn carried by the spindlehead C. The left-hand end of the spindle 16 is rotatably connected to the slide 21 against axial movement relative thereto by bearings 22. The lead screw 17 is adapted to be rotated manually or by power in either direction and at different speeds through a suitable power transmission including the shaft 23 and the gears K. Since the construction of such mechanisms is conventional and not essential to the understanding of the present invention, they are not shown.

In accordance with the present invention, the spindle 16 is provided with an axially extending aperture, the forward portion of which aperture preferably forms a socket 24 having a slight taper to receive a tool or arbor, for example the arbor of a conventional milling machine tool. The socket 24 terminates in a cylindrical bore 25 the diameter of which, in the embodiment shown, is about one-third that of the spindle. The bore 25 is connected by an axial bore 26 with a bore 27 extending to the rear end of the spindle. The socket 24 and bore 25 are adapted to receive the conventional milling machine tool arbor L or other tool arbor, the taper of the shank 28 of which corresponds to the taper of the socket 24, and the rear cylindrical portion or pilot 30 of which fits into the bore 25. The pilot 30 is provided with the usual tapped or threaded hole 31. Alternatively, any suitable tool or tool arbor may be used provided the taper of the socket 24 is made to correspond with that of the tool or arbor.

The arbor in the present instance is provided with an adapter or lock plug 32 threaded into the hole 31, prior to its assembly with the spindle, until a flange 33 formed thereon abuts against the rearward end of the arbor L. Alternatively, the so-called adapter 32 could be formed integrally with the arbor L. To the left of the flange 33, as viewed in the drawings, the adapter 32 is provided with a head 34 connected to the flange portion 33 by a reduced portion or neck. The portion of the head 34 adjacent to the neck is frusto-conical in configuration and provides a conical surface 36 diverging rearwardly with respect to the axis of the spindle, which surface is adapted to be engaged by mechanism for binding or locking the arbor L in the spindle socket. The other half of the head 34 is also frusto-conical in shape, but faces in the opposite direction.

The mechanism shown for locking or binding the arbor L in the socket 24 comprises a collet 37 positioned within the bore 25 and screw threaded onto the forward end of a drawbar 38 extending from the bore 25 through the bore 26 where it is connected by a cylindrical member 40 to a tubular drawbar 41 extending to the rear of the spindle. Reciprocation of the drawbars 38 and 41 will move the collet 37 axially in the bore 25.

The collet 37 includes a plurality of spring or resilient fingers 45 each having a projecting wedge shaped portion provided with an inner inclined surface 46 and an outer inclined surface 47. The inner surface 46 of each wedge portion is inclined with respect to the spindle axis so as to diverge rearwardly from the axis of the spindle and is adapted to engage the rearwardly diverging surface 36 on the adapter 32 when the collet 37 is in its binding or locking position. The outer inclined surface 47 of each finger 45 also diverges rearwardly and engages an annular rearwardly diverging abutment surface 48 on a flange extending inwardly from the inner wall of a bushing 50 fixed within the bore 25 of the spindle.

The abutment surface 48 diverges rearwardly with respect to the axis of the spindle with its acute angle of inclination preferably being less than the acute angle of inclination of the surface 36 of the adapter. The inner surfaces 46 in the embodiment shown are inclined at an angle of 30° to the axis of the spindle and the outer surfaces 47 at approximately 20°. The angles of inclination of the surfaces 36, 48 correspond with those of the surfaces 46 and 47, respectively. In the binding position of the collet the wedge shaped portion of each of the fingers 45 acts as a wedge, preferably a locking wedge, operating between the fixed abutment surface 48 carried by the spindle and the inclined surface 36 of the adapter 32.

The collet 37 is continuously urged to a retracted or wedging position, shown in FIG. 3, wherein it is adapted to lock the arbor L in the spindle socket by a spring means M in the form of a plurality of oppositely facing heavy concave-convex disk-like spring members 51 positioned in the bore 27. The spring members 51 are interposed between the cylindrical member 40 fixed to the end of the drawbar 38 and a shoulder formed by the bottom of the counterbore 27. As can be readily appreciated, the spring means which holds the collet 37 in locking position must be extremely strong because the vibration, etc. produced during the cutting operation tends to loosen the tool arbor from the spindle socket. The disk members 51 shown are particularly applicable in the present instance because they require a very limited movement for operation and can be so constructed as to produce the desired amount of force and be housed within the spindle without necessitating any change in its over-all dimensions.

To release the arbor L from the spindle socket 24, the collet 37 is moved forwardly in the bore 25 to move the wedge portions of the fingers 45 from between the fixed inclined surface 48 of the bushing 50 and the inclined surface 36 of the adapter 32 and to position the wedge portions in the bore 25 forwardly of the shoulder forming the forward or right-hand side of the internal flange of the member 50 upon which the inclined surface 48 is formed. With the wedge portions of the fingers 45 forward of this shoulder, the fingers 45 will expand when the arbor is moved outwardly and permit the withdrawal of the arbor L from the spindle socket. As the collet 37 is moved forwardly by the drawbar 38 the forward portion 52 of the drawbar 38 which projects into the collet functions as an ejector or abutment member and strikes the rear or left-hand end of the adapter 32 to unseat the arbor L from the socket 24. The movement of the ejector 52, after it engages the end of the adapter 32, need only be sufficient to break the arbor away from its seat in the socket 24. Preferably the inherent resiliency of the fingers 45 urge them into engagement with adapter 32 so that the arbor will be held by the fingers after it is unseated from the socket 24. To completely remove the arbor from the spindle socket the operator need merely pull it outwardly to cause the fingers to expand and release the arbor.

The collet 37 is moved forwardly with respect to the spindle 16 from its rearward locking or binding position in bore 25 to its forward releasing-and-ejecting position by a fluid pressure (preferably air) actuated reciprocating type motor N having a piston assembly designated generally as P, slidable in a cylinder designated R fixed to the spindle slide 21 adjacent to the rearward end of the spindle. The piston assembly P comprises a plurality of pistons, in the present instance five, in the form of disk members 55 assembled upon a sleeve 56 and held in predetermined spaced relation to a flange or shoulder 57 adjacent to the right-hand end of the sleeve 56, as viewed in FIG. 3, and to each other by a plurality of sleeves 58, one of which is interposed between the shoulder 57 and the first piston 55, and the others of which are interposed between the various pistons with the exception of the last or left-hand sleeve which is located to the left of the left-hand piston and is abutted by a jam nut 60 for fixedly securing the pistons 55 and the spacing collars 58 to the sleeve 56. The sleeve 56 is slidably supported upon a cylindrical boss 61 projecting to the right from a disk 62 which forms a part of the motor assembly N. The two-part adjustable nut 19, 20 is located within the boss 61. The right-hand nut portion 19 is keyed to the sleeve 61 and the left-hand nut portion 20 is connected to the disk 62 for angular adjustment relative thereto for the purpose of taking up backlash between the nut and the spindle lead screw 17.

While the disk 62 previously referred to does not constitute a cylinder head for the fluid pressure actuated motor N, it may be considered a part of the cylinder assembly. In addition to the disk 62, the cylinder assembly comprises a plurality of cup-shaped members 63, the axial flanges of which space the bottoms or radial flanges thereof in predetermined relationship. The construction is such that a radial flange is positioned to the left of the left-hand piston 55 to the right of the right-hand piston 55, and between the intermediate pistons. The right-hand cup-shaped member 63 is provided with a flange 64 projecting to the right as viewed in FIG. 3 and through the medium of which it is bolted to the left-hand end of the feed slide 21. A bushing 65 is interposed between the flange 64 and the sleeve 56 of the piston assembly. The piston assembly is slidable relative to the cylinder assembly and the relatively movable surfaces are sealed by suitable O-ring seals 66.

The construction shown provides five tandem fluid pressure operated reciprocating type motors connected by suitable conduit means including headers 67, 68 and ports 70, 71, in such a manner that they are double-acting. The headers 67, 68 which are formed within the cylinder assembly are connected by suitable tubing 72, 73 to a three-way solenoid operated valve 74 adapted to control the flow of fluid pressure to and from the cylinders of the motor.

The right-hand end of the sleeve 56 of the piston assembly is counterbored as indicated by the reference character 75 to receive with a small amount of clearance a flange-like member 76 fixedly secured to the rear or left-hand end of the tubular draw rod or bar 41. The construction is such that when fluid pressure is admitted to the fluid pressure operated motor N through the tubing 72, the header 67 and the ports 70, that is, in the direction to move the piston assembly P toward the right, the shoulder formed by the counterbore 75 abuts against the left-hand end of the member 76 and pushes the drawbar 41, the cylindrical member 40, the drawbar 38, and in turn, the collet 37 to the right to release and unfreeze the tool arbor L from the spindle socket 24. Upon release of the pressure fluid from the tubing 72, pressure fluid is preferably applied through the tubing 73 to the opposite side of the pistons 55 for a short interval of time for the purpose of moving the sleeve 56 free of the member 76, there being a small clearance provided between the abutting surfaces of these members when they are in their respective left-hand positions. The purpose of this clearance is to eliminate the wear which might otherwise occur therebetween since the drawbars and the member 76 rotate with the spindle 16 while the piston assembly P preferably remains stationary during the operation of the spindle.

Fluid pressure, preferably air, is supplied to the solenoid operated valve 74 by a conduit 82 leading to the usual shop air supply. The valve is supported in the rear end of the spindle head in a suitable manner and the operation thereof to control the flow of fluid pressure to the motor N in the direction to release the spindle binder is preferably controlled by a push-button switch 83 located at a convenient position near the front or tool end of the spindlehead where it is readily accessible to the operator while he is holding the tool arbor in the spindle socket, it being understood that in machines of the character shown, the rear or left-hand end of the spindle is not within the reach of an operator at the tool end of the spindle. The supply of fluid pressure to the motor or motors for moving the piston assembly free of the rear end of the spindle assembly, which in the present instance is the member 76, is preferably automatic, but only for a short duration, upon the release of pressure fluid from the opposite end of the motors. This can be readily accomplished by suitable switching means including a time delay mechanism.

When the operator wishes to attach a tool to the spindle, he depresses the push-button switch 83 to cause pressure fluid to enter the motor N in the manner to move the collet 37 outwardly; that is, to the right as viewed in the drawings. He then inserts the tool arbor in the spindle socket and subsequently releases the push button 83, whereupon the spring means M securely binds the tool arbor in the spindle socket and the instantaneous application of pressure fluid to the opposite sides of the pistons 55 returns or moves the piston assembly P free of the spindle assembly. When the operator wishes to remove the tool, he merely reverses the operation.

The motor N must provide not only adequate force to overcome the spring means M which holds the spindle arbor in the socket and which, as previously stated, must be very substantial, but sufficient force to unfreeze the spindle arbor from the socket, which force is also substantial because of the low angle of taper employed in the socket. As can be readily appreciated, the less the taper, the more securely will the tool arbor be held in the spindle socket. The present invention provides a construction wherein the necessary forces can be obtained with use of the usual shop compressed air supply, while maintaining the overall diameter of the motor means to a minimum. This is of considerable practical advantage because of the expense involved in providing a special high pressure air supply.

From the foregoing, it is also apparent that the objects heretofore enumerated and others have been accomplished and that a new and improved machine tool has been provided having a spindle including a spring applied and power released locking or binding mechanism for releasably securing an arbor or tool in the spindle socket which is extremely reliable in operation and compact in construction.

While the preferred form of the invention has been described in considerable detail, it will be apparent that the invention is not limited to the construction shown and it is my intention to cover hereby all adaptations, modifications and changes therein which come within the practice of those skilled in the art to which the invention relates and the scope of the appended claims.

Having thus described my invention, I claim:

1. In a combined milling, drilling and boring machine, a spindlehead frame, a spindle member having an axially extending aperture the front portion of which forms a rearwardly converging tapered socket for the reception of a tool holding device, means for rotatively and slidably supporting said spindle member in said spindlehead frame, means comprising a cooperating lead screw and nut for reciprocating said spindle member in said spindlehead frame, means supporting said lead screw in said spindlehead frame for rotation about an axis coaxial with the axis of rotation of said spindle member, means preventing relative movement between said lead screw and said spindlehead frame lengthwise of the axis of rotation of said lead screw, a drawbar member within said axially extending aperture in said spindle member, means supporting said drawbar member within said axially extending aperture in said spindle member for limited reciprocation axially thereof, means for operatively connecting said drawbar member to and from a tool holding device positioned in said socket, relatively strong spring means in said axially extending aperture in said spindle member operatively connected between said spindle member and said drawbar member biasing said drawbar member rearwardly relative to said socket in said spindle member, means on said drawbar member adapted to engage and eject a tool holding device secured in said socket when said drawbar member is moved forwardly relative to said spindle member, a reciprocating-type pressure fluid actuated motor means concentric with said lead screw and comprising a cylinder assembly provided with a plurality of chambers each having therein a piston of a piston assembly comprising a plurality of pistons arranged in tandem relative tot the axis of rotation of said spindle and connected to a common piston rod, means operatively connecting one of said assemblies to one of the said members for axial movement therewith but permitting relative rotation therebetween, means for operatively connecting said nut with said one of said assemblies for movement therewith, means operatively connecting the other of said assemblies with the other of said members for moving said drawbar member forwardly with respect to said spindle member against the action of said spring means upon the application of pressure fluid to said motor, and means for seletively supplying pressure fluid simultaneously to said chambers of said motor.

2. In a machine tool, a movable spindlehead, a spindle member having an axially extending aperture opening into one end, means for rotatably connecting said spindle member to said spindlehead, a bar member within said axially extending aperture in said spindle member, means supporting said bar member within said axially extending aperture in said spindle member for limited reciprocation axially thereof, a collet member connected to the end of said bar member adjacent to said one end of said spindle member for selectively connecting said member to a tool device positioned at said one end of said spindle member, means providing an inclined abutment surface on said spindle adjacent to said collet, said collet member including a radially movable portion with a first inclined surface for engaging and holding a portion of the tool device received in said collet member and a second inclined surface for engaging and cooperating with said abutment surface upon relative movement between said spindle member and said bar member in one direction to move said movable portion of said collet radially to wedge said first inclined surface into engagement with the portion of the tool device engaged thereby, a plurality of concave-convex disk springs to apply a first force on said bar member in said one direction, and means for applying a second force to said bar member in a direction opposite said one direction to overcome the first force applied by said springs including a reciprocating-type pressure fluid actuated motor means comprising a cylinder assembly provided with a plurality of chambers and each having a piston therein of a piston assembly comprising a plurality of pistons arranged in tandem relation relative to the axis of rotation of said spindle member for moving said bar member with respect to said spindle member, and means for selectively supplying pressure fluid to said chambers of said motor, said abutment surface and said first and second inclined surfaces of said movable portion of said collet being inclined in the same general direction with respect to the axis of rotation of said spindle member and converging in the direction of movement of said collet member in said one direction.

References Cited in the file of this patent

UNITED STATES PATENTS

| 825,866 | Rogers | July 10, 1906 |
| 2,860,547 | Stephan | Nov. 18, 1958 |